US006209033B1

(12) United States Patent
Datta et al.

(10) Patent No.: US 6,209,033 B1
(45) Date of Patent: Mar. 27, 2001

(54) APPARATUS AND METHOD FOR NETWORK CAPACITY EVALUATION AND PLANNING

(75) Inventors: Utpal Datta, Bedford; Lundy Lewis, Mason, both of NH (US)

(73) Assignee: Cabletron Systems, Inc., Rochester, NH (US)

( * ) Notice: Subject to any disclaimer, the term of this patent is extended or adjusted under 35 U.S.C. 154(b) by 0 days.

(21) Appl. No.: 08/855,222

(22) Filed: May 13, 1997

Related U.S. Application Data

(63) Continuation-in-part of application No. 08/382,294, filed on Feb. 1, 1995, now Pat. No. 5,706,436.

(51) Int. Cl.[7] .................................................. G06F 15/173
(52) U.S. Cl. .................... 709/224; 395/200.53; 709/223; 370/232
(58) Field of Search ......................... 395/200.53, 200.54, 395/200.55; 709/223, 224, 225, 238, 235, 233, 232; 370/232, 238

(56) References Cited

U.S. PATENT DOCUMENTS

| | | | |
|---|---|---|---|
| 4,345,116 | * 8/1982 | Ash et al. ............................. | 179/18 |
| 5,343,465 | 8/1994 | Khalil .................................... | 370/17 |
| 5,467,345 | * 11/1995 | Cutter, Jr. et al. ..................... | 370/60 |
| 5,583,792 | * 12/1996 | Li et al. ................................ | 370/232 |
| 5,608,721 | * 3/1997 | Natarajan et al. .................... | 370/238 |
| 5,680,325 | * 10/1997 | Rohner ................................. | 709/201 |
| 5,687,292 | * 11/1997 | Boda et al. ...................... | 395/200.55 |
| 5,745,694 | * 4/1998 | Egawa et al. ................... | 395/200.55 |
| 5,848,057 | * 12/1998 | Lee et al. ............................ | 370/232 |
| 5,854,903 | * 12/1998 | Morrison et al. .................... | 709/249 |
| 5,933,416 | * 8/1999 | Schenkel et al. .................... | 370/254 |
| 5,940,372 | * 8/1999 | Bertin et al. ........................ | 370/238 |
| 5,943,480 | * 8/1999 | Neidhardt ............................. | 709/226 |
| 6,021,113 | * 2/2000 | Dashi et al. ......................... | 370/228 |

FOREIGN PATENT DOCUMENTS

WO 96/24211    8/1996    (WO) .

OTHER PUBLICATIONS

Carter et al, "Measuring Bottleneck Link Speed in Packet Switched Networks," Computer Science Department, Boston University BU–CS–96–006, Mar. 15, 1996.*
Mills, R., "Communication Network Analysis With Comnet 11.5", Proceedings of the Winter Simulation Conference, Washington, Dec. 4–6, 1989, No. 4 Dec. 1989, pp. 215–221, XP000207440, Macnair E. A., Musselman K.J.; Heidelberger P.
Ishiwa N. et al., "An Expert System For Planning Private Networks," NEC Research and Development, vol. 35, No. 3, Jul. 1, 1994, pp. 306–314, XP000468662.

\* cited by examiner

*Primary Examiner*—Mehmet B. Geckil
(74) *Attorney, Agent, or Firm*—Wolf, Greenfield & Sacks, P.C.

(57) ABSTRACT

Network capacity evaluation and planning is performed based upon the traffic across the links of the network. Once a link's traffic volume has been measured, it is compared with the link's traffic capability, and the resulting parameters compared with the traffic and capability of other links of the network to create measures of network capacity and balance. Then, simulated changes to the network configuration may be made by substituting simulated traffic volume amounts and capabilities for selected link traffic measurements and capabilities, and the resulting measures of network capacity and balance may then be compared to determine whether the simulated changes represent a preferred network configuration.

16 Claims, 11 Drawing Sheets

| 100 | MEASURED DATA 101 | PREDETERMINED DATA 102 | | | EVALUATION FACTORS 103 | | | | | |
|---|---|---|---|---|---|---|---|---|---|---|
| LinkName | Volume | BW | LB | UB | ABU | COB | COT | ELB | ELU | ENC |
| Link 1-2 | V12 | | | | | | | | | |
| Link 1-3 | V13 | | | | | | | | | |
| Link 1-4 | V14 | | | | | | | | | |
| Link 1-5 | V15 | | | | | | | | | |
| Link 2-3 | V23 | | | | | | | | | |
| Link 2-4 | V24 | | | | | | | | | |
| Link 2-6 | V26 | | | | | | | | | |
| Link 3-4 | V34 | | | | | | | | | |
| Link 3-7 | V27 | | | | | | | | | |
| Link 4-8 | V48 | | | | | | | | | |

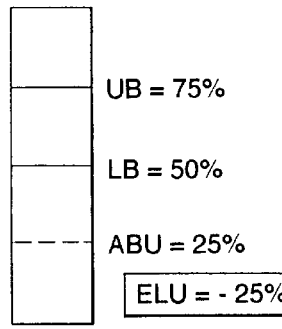
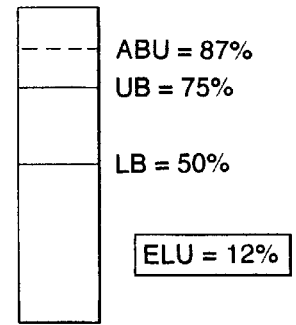
FIG. 12A     FIG. 12B     FIG. 12C
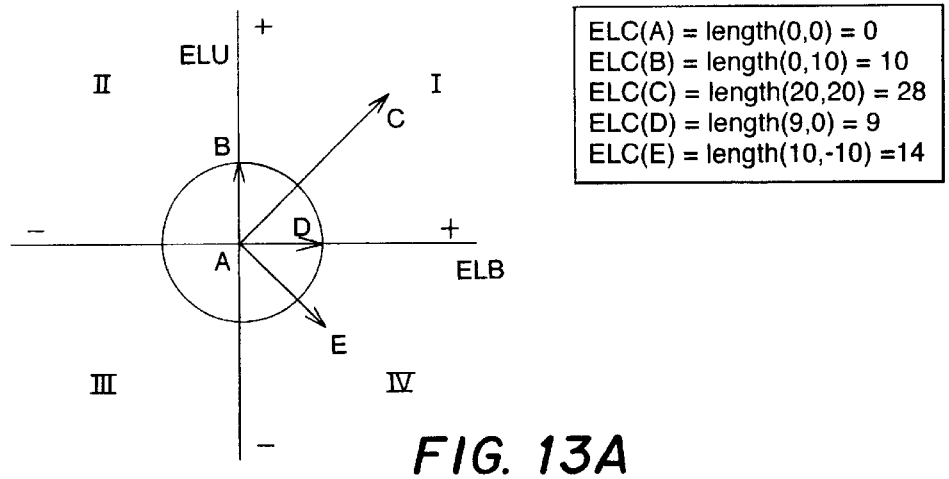
FIG. 13A
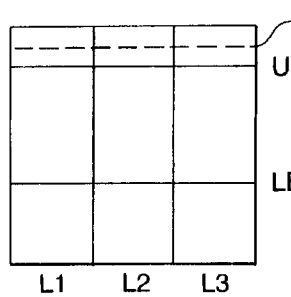
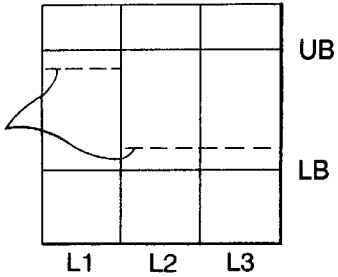
FIG. 13B     FIG. 13C

APPARATUS AND METHOD FOR NETWORK CAPACITY EVALUATION AND PLANNING

RELATED CASES

This case is continuation in part of and commonly owned U.S. Ser. No. 08/382,294, entitled "Apparatus and Method for Evaluating Network Traffic Performance," filed on Feb. 1, 1995, U.S. Pat. No. 5,706,436 from which priority is claimed and which is hereby incorporated by reference in its entirety.

DISCUSSION OF THE RELATED ART

1. Field of the Invention

This invention relates to computer network communications systems, and in particular to techniques for evaluating network traffic capacity and evaluating alternative network configurations.

2. Background of the Invention

Computer networks are widely used to provide increased computing power, sharing of resources and communication between users. Networks may include a number of computer devices within a room, building or site that are connected by a high-speed local data link such as token ring, Ethernet, or the like. Local area networks (LANs) in different locations may be interconnected by for example packet switches, microwave links and satellite links to form a wide area network (WAN). A network may include several hundred or more connected devices, distributed across several geographical locations and belonging to several organizations.

In the operation and maintenance of computer networks a number of issues arise, including traffic overload on parts of the network, optimum placement and interconnection of network resources, security, isolation of network faults, and the like. These issues become increasingly complex and difficult to understand and manage as the network becomes larger and more complex. For example, if a network device is not sending messages, it may be difficult to determine whether the fault is in the device itself, a data communication link, or an intermediate network device between the sending and receiving devices.

Network management systems are intended to resolve such issues. Older management systems typically operated by collecting large volumes of information which then required evaluation by a network administrator, and thus placed a tremendous burden on and required a highly-skilled network administrator.

Newer network management systems systematize the knowledge of the networking expert such that common problems of a single domain (i.e., a portion of the network under common management) can be detected, isolated and repaired, either automatically or with the involvement of less-skilled personnel. Such a system typically includes a graphical representation of that portion of the network being monitored by the system. Alarms are generated to inform an external entity that an event has occurred or requires attention. Since a large network may have many such events occurring simultaneously, some network management systems provide alarm filtering (i.e., only certain events generate an alarm).

Commercially available network management systems and applications for alarm filtering include: (1) SPECTRUM®, Cabletron Systems, Inc., 35 Industrial Way, Rochester, N.H. 03867; (2) HP OpenView, Hewlett Packard Corp., 3000 Hanover Street, Palo Alto, Calif. 94304; (3) LattisNet, Bay Networks, 4401 Great American Pkwy., Santa Clara, Calif. 95054; (4) IBM Netview/6000, IBM Corp., Old Orchard Road, Armonk, N.Y. 10504; (5) SunNet Manager, SunConnect, 2550 Garcia Ave, Mountain View, Calif. 94043; and (6) NerveCenter, NetLabs Inc., 4920 El Camino Real, Los Altos Calif. 94022.

To evaluate the performance of a communications network, both the network configuration and the raw message traffic data may be analyzed. Network configuration, also called network topology, refers to the structure of a network's physical and virtual connections, and may include the structure of the network's nodes as well. Generally, a network is made up of one or more physical or logical subnets (segments), where each subnet includes a plurality of nodes (e.g., servers and host computers). Different subnets in a network may be connected by a network trunk. The performance analysis may include consideration of the network load on various subnets based on number of packets, packet collision rate, packet deferment rate, packet length, and network communication protocols. This information is normally obtained by placing monitors at selected points in the network. These monitors, also called daemons, network monitors, or network analyzers, monitor the traffic that flows through the selected points.

Some current monitors simply report various parameters of network packets in real time. For example, the table of FIG. 1 shows a few seconds of network activity 10 where the parameters of interest are packet length 11, protocol 12, source node 13, destination node 14, source port 15, and destination port 16. However, an analysis of such raw data is rather cumbersome, particularly if the raw data has been collected for days or months. Thus, tools have been built that can transform the raw data into graphical representations such as bar graphs, X-Y plots, histograms, and scatter plots, shown generally as 20 in FIG. 2.

Other monitors display a topological view of the network showing the amount of traffic flowing among the various nodes. Over time, the monitor discovers all of the traffic patterns on the subnet, and in some instances also indicates the amount of traffic between the nodes by, for example, line color or line thickness.

However, the prior methods of monitoring network performance as shown for example in FIGS. 1–2, provide only the ability to monitor, but do not provide the ability to evaluate alternative network topologies or to perform comparison studies. In addition, the previous methods do not provide an indication of the overall balance of traffic on a network.

It would be desirable for a network management system to have the ability to evaluate the overall capacity of a particular network configuration and analyze alternate configurations.

SUMMARY OF THE INVENTION

In accordance with one aspect of the invention, network capacity evaluation and planning (CEP) is performed based upon the traffic across the links of the network. Once a link's traffic volume has been measured, it is compared with the link's traffic capability, and the resulting parameters may be compared with the traffic and capability of other links of the network to create measures of network capacity and balance. Then, simulated changes to the network configuration may be made by substituting simulated traffic volume amounts and capabilities for selected link traffic measurements and capabilities, and the resulting determinations of network capacity and balance may then be compared to determine whether the simulated changes represent a preferred network configuration.

An embodiment of the invention is directed to a method for evaluating network traffic on a communications network, the network having a present configuration of nodes connected by a plurality of links, the method comprising the steps of determining a traffic capability for an amount of time for each of the plurality of links of the network, measuring a traffic volume for the amount of time across each of the plurality of links, and evaluating a communications capability of the communications network based upon the traffic capability and the traffic volume.

The communications capability may also be evaluated by determining a contribution to an overall bandwidth of the communications network by a first link of the plurality of links based upon the traffic capability of the first link with respect to a traffic capability of all of the plurality of links, and may also include determining a contribution to an overall traffic of the communications network by a first link of the plurality of links based upon the traffic volume across the first link with respect to a traffic volume across all of the plurality of links. The link balance for the first link may then be evaluated based upon a comparison between the contribution to overall bandwidth and the contribution to overall traffic.

The communications capability may also be evaluated by evaluating a link balance for a first link of the plurality of links based upon a comparison between a contribution to overall bandwidth of the communications network by the first link and a contribution to overall traffic of the communications network by the first link. Additionally, an upper bound and a lower bound of link utilization may be defined for a first link of the plurality of links, and in such a case the communications capability may be evaluated by evaluating a link utilization of the first link of the plurality of links with respect to the upper bound and the lower bound, based upon the traffic volume of the first link.

Additionally, the communications capability of an alternative configuration of the communications network may be evaluated having a modified traffic capability and a modified traffic volume, and the configuration of the communications network may be modified to yield the alternative configuration.

These and other features of the present invention will be understood from the following detailed description.

BRIEF DESCRIPTION OF THE DRAWINGS

FIGS. 11A, 11B, and 11C illustrate three evaluations of link balance for three different instances of link traffic;

FIGS. 12A, 12B, and 12C illustrate three different evaluations of link utilization for a particular link;

FIG. 13A illustrates an evaluation of link balance (ELB) and an evaluation of link utilization (ELU) for a particular link;

FIGS. 13B and 13C each show an example of the average link bandwidth and contribution to overall traffic for three different links, as compared to an upper bound and a lower bound that have been defined for each of the three links;

DETAILED DESCRIPTION

Figure 1:
FIG. 1 is a table of raw traffic data from a prior art monitor.
Figure 2:
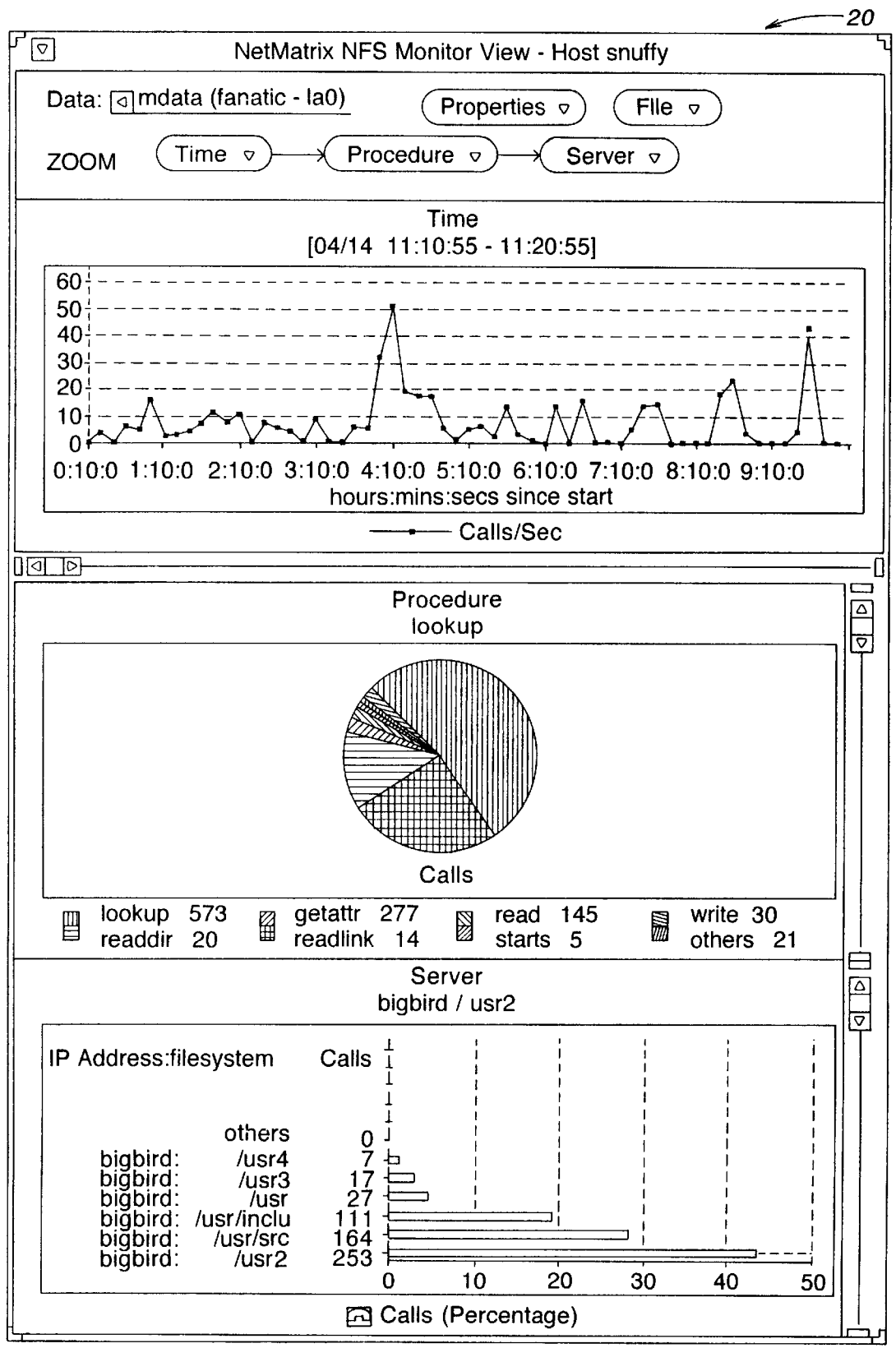
FIG. 2 is a prior art graphical display with various representations of network traffic.
Figure 3:
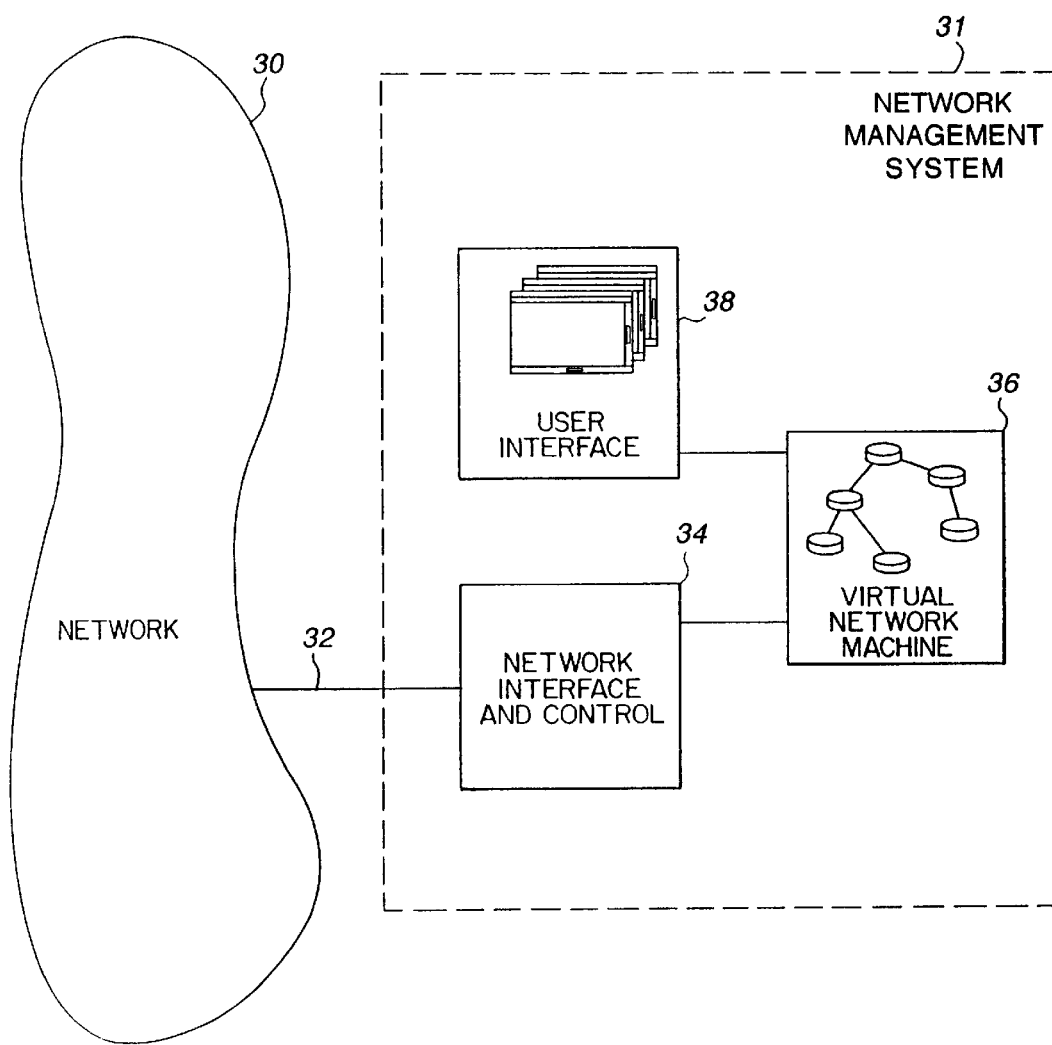
FIG. 3 is a schematic illustration of the relationship between a network and a network management system.

FIG. 3 is a block diagram illustrating generally the arrangement of a network management system 31 which monitors a live network 30 via a communication interface 32. In this example the network management system (NMS) 31 is a client-server based NMS known as SPECTRUM®, which includes a database of models relating to corresponding network entities and relationships among those entities. The SPECTRUM server includes a network interface and control module 34 and a virtual network machine 36, and the SPECTRUM client includes a user interface 38.

The SPECTRUM NMS continually monitors the network 30 and maintains a database of information about managed entities within the network 30. An understanding of the present invention is furthered by an understanding of a model-based network management system such as SPECTRUM, which is described in U.S. Pat. No. 5,261,044, issued Nov. 9, 1993 to R. Dev et al., and hereby incorporated by reference in its entirety. The SPECTRUM system is commercially available and also described in various user manuals and literature available from Cabletron Systems, Inc., Rochester, N.H., USA.

In summary, SPECTRUM is a system for maintaining and processing information pertaining to the condition of the computer network and providing the same to a user, the network including a plurality of network resources such as computer devices and software applications being executed on such devices. The system includes a virtual network machine 36, comprising a programmed digital computer, wherein a program is implemented using an object-oriented programming language such as C++, Eiffel, SmallTalk, and Ada. The virtual network machine 36 includes interrelated intelligent models of network entities and relations between network entities, including a capability for acquiring network data pertaining to the condition of a network entity from the corresponding network entity, and for those entities not capable of being contacted, inferring their status from the status of other entities. The virtual network machine 36 maintains objects which include network data relating to the corresponding network entity and one or more inference handlers for processing the network data, the inference handlers being responsive to changes occurring in the same and/or a different object. The network data can then be transferred to a user interface 38 coupled to the virtual network machine 36, for supplying the network data to a user.

Thus, the models may be implemented as software "objects" containing both "data" (attributes) relating to the corresponding network entity and one or more "inference handlers" (functions) for processing the data. See Grady Booch, "Object-Oriented Analysis And Design, With Applications," 2nd Edition, Benjamin/Cummings Publishing Co., Redwood City, Calif., Chapter 2 (1994). The inference handlers may be initiated by predetermined virtual network events, such as a change in specified network data in the same model, a change in specified network data in a different model, and predefined events or changes in models or model relations. Information pertaining to the condition of the network resource can be obtained from the network entity by polling the resource, can be automatically received from the network resource without polling, or can be inferred from data contained in other models. An alarm condition may be generated when the network data meets a predetermined criteria. Events, alarms and statistical information from the virtual network may be stored in a database to be selectively displayed for the user.

The data in the SPECTRUM database may be used for generating topological displays of the network, showing hierarchial relationships between network devices, isolating a network fault, reviewing statistical information, as well as other functions.

The SPECTRUM network management system allows for collective management of autonomous local area networks (LANs), with equipment from different vendors. It complies with the current Simple Network Management Protocol (SNMP) standards, and can also accommodate other standard and proprietary protocols. The virtual network machine 36 preprocesses the raw information coming from the network entities through the network interface and control module 34 in order to construct a model of the network's current status and performance characteristics. Network entities that cannot be directly communicated with (e.g., cables and buildings) can infer their status from the status of the entities connected to or contained within them. The virtual network machine 36 provides a consistent interface for management applications to access any of the information in the model and thereby provides these applications with a unified view of the network 30.

The SPECTROGRAPH® user interface 38 provides a highly graphical multi-perspective view into the network model. The user interface enables the user to navigate through a landscape in which cables, networks, local area networks and even rooms show up as icons, and which icons indicate the health and performance characteristics of those elements. Many of these icons can be further queried for additional information. The main function of the user interface 38 is to visually present to the user the model within the virtual network machine 36. It allows the user to navigate freely within the network model, only limited by the access rights assigned by the network administrator. The information can be accessed at varying degrees of detail, from a macro overview, down to the level of the devices and the cables which connect them. In addition to its navigation functions, the SPECTROGRAPH user interface provides an alarm management facility, an event log window, a reporting facility, a find facility, and other features.

Figure 4:
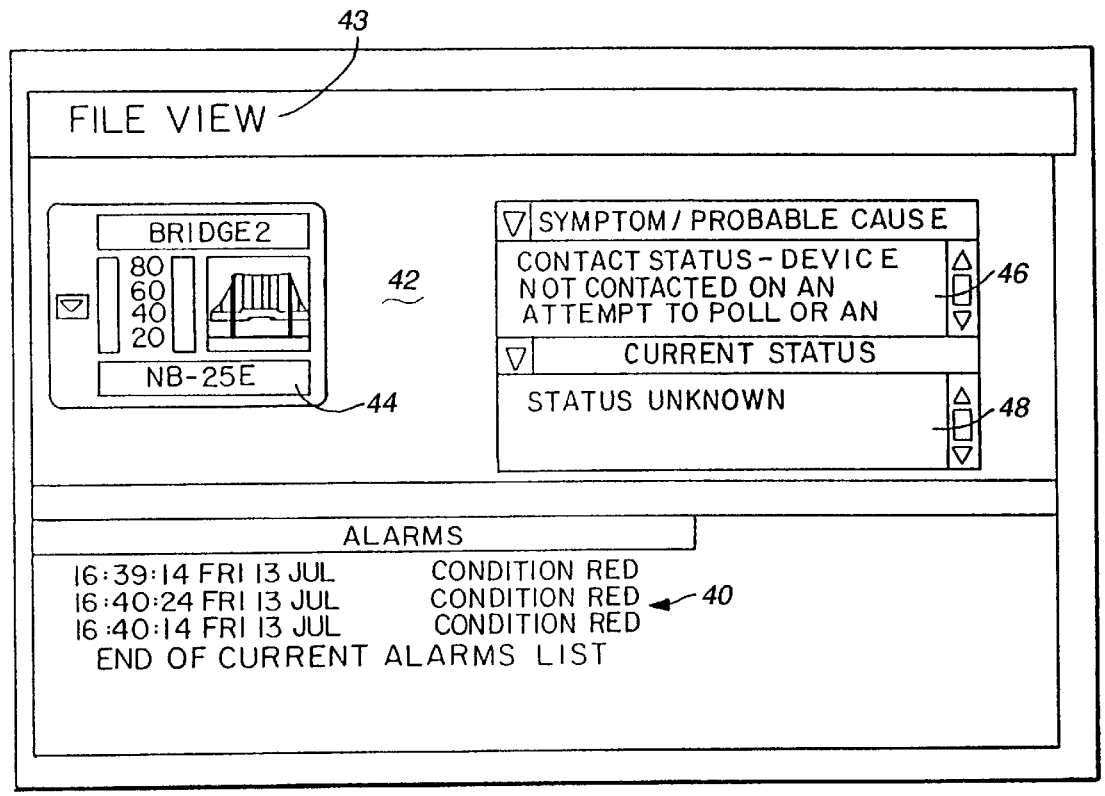
FIG. 4 is a view of a user interface of a network management system such as that shown in FIG. 3.

An example of the alarm log view provided by the SPECTROGRAPH user interface 38 is illustrated in FIG. 4. The alarm log view 43 may include an area 40 for the listing of current alarms, and an area 42 for displaying information pertaining to a selected alarm. A user, such as a system administrator or a technician, may select a particular alarm in the listing of current alarms to obtain more information. A multi-function icon 44 representing the network device having the fault is displayed in area 42, and one or more text fields 46 and 48 which provide information regarding the cause of the alarm and the status of the device. By selecting specified areas of the icon 44, the user can obtain further information regarding the device for which an alarm is registered.

Figure 5:
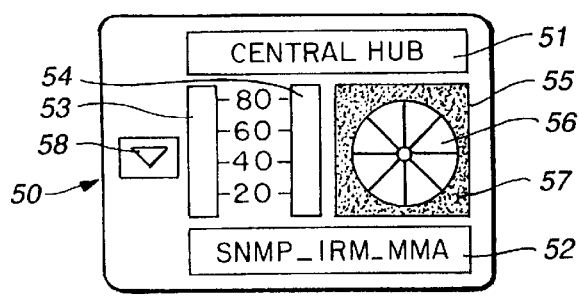
FIG. 5 is a diagram showing exemplary detail of the device icon of FIG. 4.

FIG. 5 is a diagram showing exemplary detail of an icon 50, similar to the icon 44 of FIG. 4. The icon 50 may include an area 51 for a device name, an area 52 for model type information, bar graphs 53 and 54 for indicating performance parameters, an area 55 for displaying a symbolic representation 56 of the device, a background area 57 for displaying the status in color of the device, and a figure 58 for selecting more detail about the device.

Alternatively, instead of or in combination with the user interface 38, information from the virtual network machine 36 may be provided directly to another computer program, or may be provided to a user via electronic mail or a telephone message that is automatically transmitted.

An important challenge for network management and control is capacity evaluation and planning (CEP), which generally includes monitoring current network characteristics, understanding environmental constraints and considerations, and forecasting future needs and technology. CEP further includes evaluating technical opportunity, creating appropriate, consistent, and coordinated plans on a short-, medium-, and long- term basis, and modifying plans based on results of actual network implementations to provide cost-effective and timely communication services to users.

Several CEP products are available which achieve different levels of effectiveness, including OPNET, COMNET III, BONeS DESIGNER, and others. Although these CEP products have been successful in some controlled situations, their main disadvantage arises from their use of a CEP analysis based on exact mathematical models of the network being monitored. The amount of processing time and storage requirements for such implementations are often exorbitant and prohibitive for a large-scale network. Additionally, such an approach requires performance models of vendor-specific network devices such as hubs, routers and switches, but such performance models are not typically available due to the proprietary nature of these models.

To overcome such limitations, an embodiment of the invention performs CEP on a network based upon the traffic volume across the links of the network. The storage and processing requirements are reduced and limited or no information is required regarding vendor-specific devices. Once traffic volume on a link has been measured, it is compared with the link's traffic capability, and the resulting parameters compared with the traffic and capability of other links of the network to create measures of network capacity and balance. Then, simulated changes to the network configuration are made by substituting simulated traffic volume amounts and capabilities for selected link traffic measurements and capabilities, and the resulting determinations of network capacity and balance are compared to determine whether the simulated changes represent a preferred network configuration. Alternatively, all measurements may be simulated in order to provide assistance in defining a network, or all measurements may be actual, so that over time a network administrator may determine whether a new configuration is superior to a previous configuration.

Thus, according to this embodiment one evaluates the present capacity of the network, and then determines the potential effect on network capacity of a change in network configuration. Examples of such changes include relocating/adding/deleting network devices, relocating/adding/deleting network users, relocating/adding/deleting subnets and/or switches, modifying policies that govern communications, and modifying routing or switching algorithms. The alternate configurations may be automatically generated and evaluated and if superior, these alternate configurations may be implemented.

Figure 6:
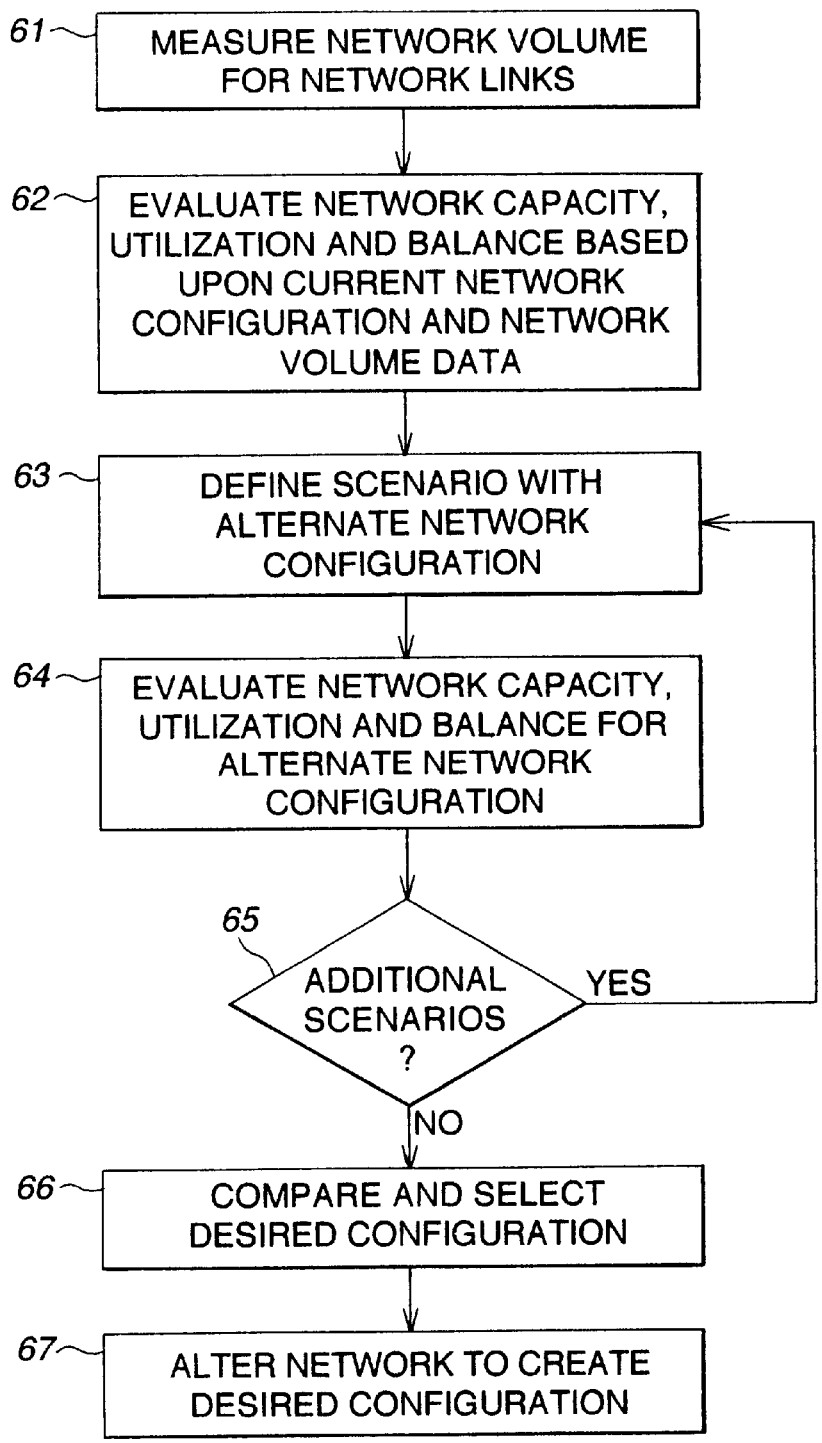
FIG. 6 is a process flow diagram showing steps of a process in accordance with an embodiment of the invention.

FIG. 6 shows a process flow diagram in accordance with an embodiment of the invention. In step 61, network volume across at least some of the links of a network is measured. This volume V may be represented by a number of bytes of data, number of data packets, number of cells, or any similar unit which is representative of the volume of data. Then, the network capacity, utilization, and balance is evaluated based upon the current network configuration and the network volume data (step 62). The network configuration may be a factor in this evaluation when it defines the traffic capabilities of certain links.

In step 63, a scenario with an alternate network configuration is defined, either by a network administrator, or by extracting data from a database of alternative configurations, or by automatically generating data that defines the alternate configuration. Then, in step 64, the network capacity, utilization, and balance is evaluated for the alternate configuration. If additional scenarios are desired as determined in step 65, then steps 63 and 64 may be repeated for the additional scenarios. Once alternate configurations have been evaluated, these evaluations are compared with one another to select a desired configuration (step 66), and the network configuration may then be altered to the desired configuration (step 67).

Figure 7:
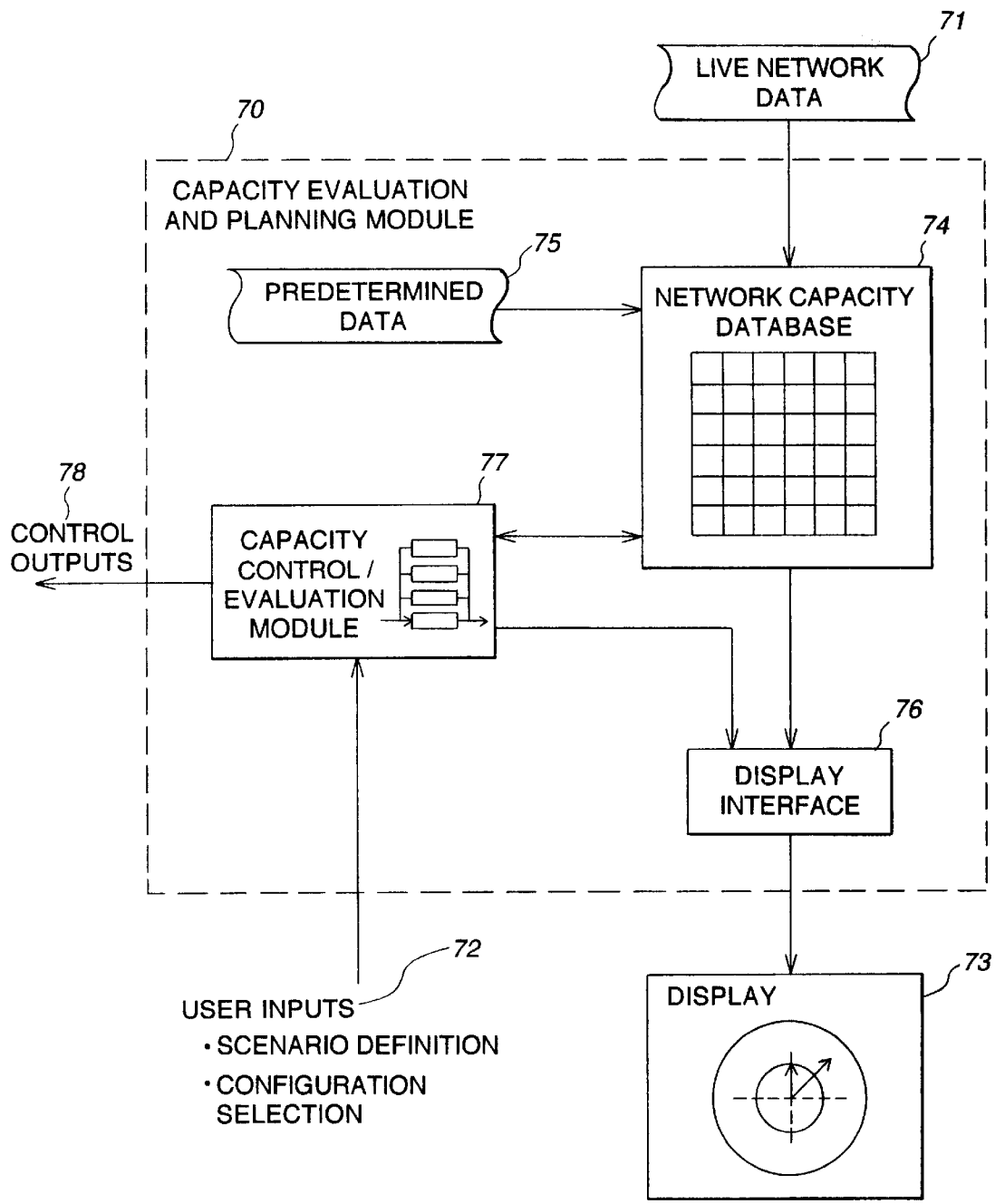
FIG. 7 is a structural block diagram of a capacity evaluation and planning module of an embodiment of the invention, which may be included in the network interface and control module of FIG. 3.

FIG. 7 is a block diagram of a particular embodiment of the invention, which includes a capacity evaluation and planning (CEP) module 70 that receives live network data 71 as well as user inputs 72 (such as scenario definition and configuration selection). The CEP module 70 may also be coupled to a display 73 for displaying results to the user, and may also provide control outputs 78 to cause the network configuration to be altered if desired.

At least one embodiment of the invention includes a network monitor as the primary means to collect the live network data 71. However, alternate configurations may receive only simulation data, previously stored data, or a combination of actual data, simulation data, and stored data. Examples of suitable network monitors include the following: 1) Sniffer, Network General Corporation, 4200 Bohannon Drive, Menlo Park, Calif. 94025; 2) NetMetrix, Hewlett-Packard Corporation, 1 Tara Boulevard, Nashua, N.H. 03062; 3) LANalyzer, Novell, Inc., 122 East 1700 South, Provo, Utah 84606-6194; and 4) SPECTRUM Network Management System, Cabletron Systems, Inc., Rochester, N.H. The network monitor may include basic low-level programs such as "Etherfind" on Sun workstations, or "Netsnoop" on Silicon Graphics IRIX workstations.

One embodiment of the CEP module 70, as shown in FIG. 7, includes a network capacity database 74, predetermined data 75, a display interface 76, and a capacity control/evaluation module 77. The network capacity database 74 receives the live network data 71 as well as the predetermined data 75, and is controlled by the capacity control/evaluation module 77, which in turn receives the user inputs 72 and provides the control outputs 78. The display interface 76 is coupled between the network capacity database 74, the capacity control/evaluation module 77, and the display 73.

An overview of the operation of the system shown in FIG. 7 is as follows. The network capacity database 74 is populated with live network data 71, such as data indicative of traffic being transmitted over links of the network. Additionally, the network capacity database 74 may be populated with predetermined data 75 indicative of capacity of the links. The capacity control/evaluation module 77 then extracts data from the network capacity database 74, performs operations such as those shown in FIG. 5 on the data to create additional data, and stores the additional data in the network capacity database 74. This additional data, which includes for example results of comparisons among alternate network configurations, may then be displayed to the user via display 73. Additionally, the user can define scenarios and select the desired configuration via user inputs 72, and the capacity control/evaluation module 77 may control the network directly or via interim control mechanisms to invoke the desired network configuration.

Figure 8:
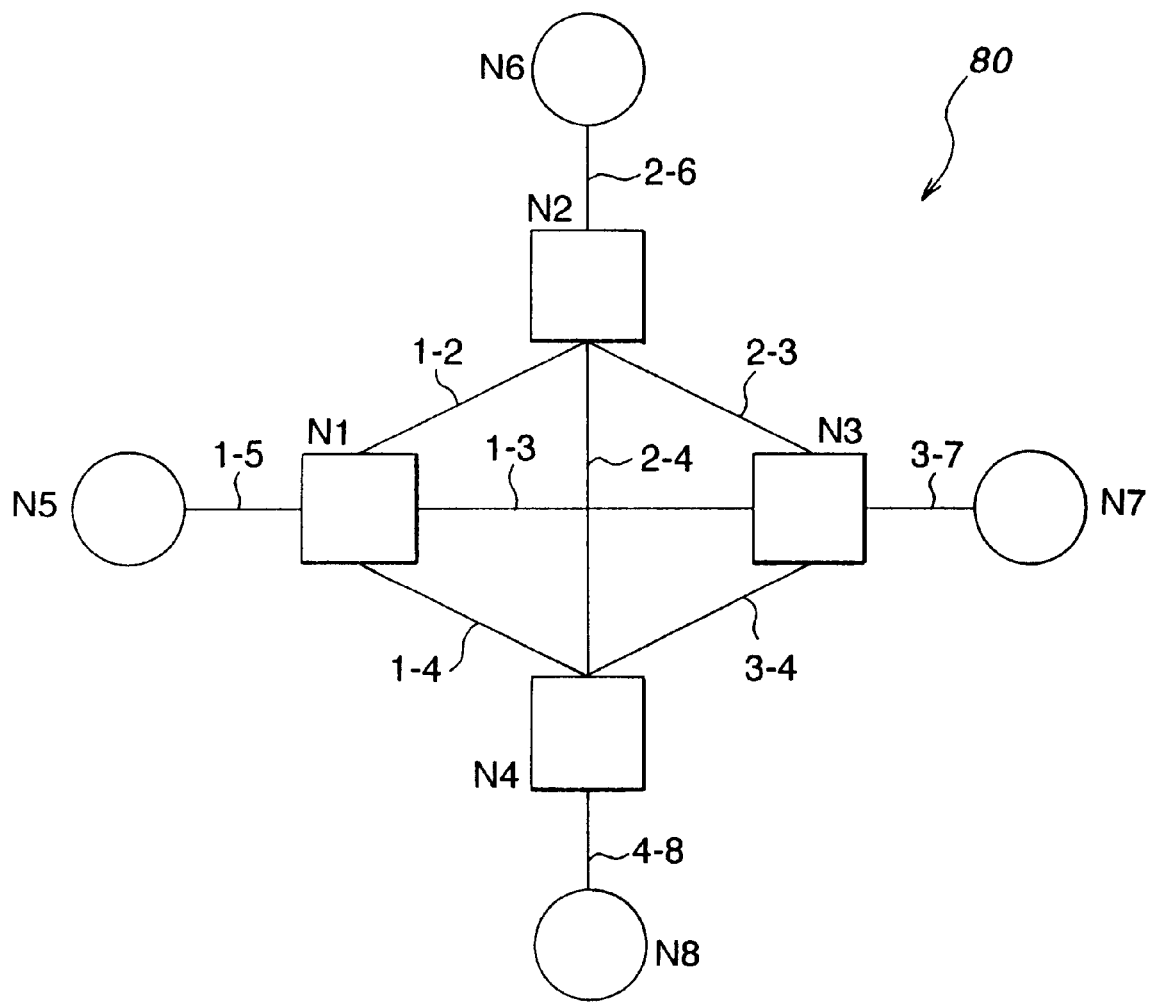
FIG. 8 is a diagram of an exemplary hybrid packet and cell-based network.

One embodiment of the invention will be explained with reference to a theoretical hybrid network 80 including both packet and cell-based segments, for example that shown in FIG. 8. The network 80 includes eight nodes N1–N8. Nodes N1, N2, N3, and N4, are indicated as squares in FIG. 8 to represent cell-based switches, while nodes N5, N6, N7, and N8 are indicated as circles to represent packet-based subnets. Subnet N5 is coupled to switch N1 via packet link 1–5, subnet N6 is coupled to switch N2 via packet link 2–6, subnet N7 is coupled to switch N3 via packet link 3–7, and subnet N8 is coupled to switch N4 via packet link 4–8. Additionally, FIG. 8 depicts a mesh switched network among the switches N1–N4, wherein: switch N1 is coupled to switches N2, N3 and N4 by cell links 1–2, 1–3, and 1–4 respectively; switch N2 is coupled to switches N3 and N4 by cell links 2–3 and 2–4 respectively; and switches N3 and N4 are coupled via cell links 3–4. For example, the cell links of FIG. 8 may be asynchronous transfer mode (ATM) links over which 58-byte segments of packets are transfered.

Embodiments of the invention are described below with respect to a hybrid network such as that shown in FIG. 8 to show that the features are applicable to cell-based networks as well as packet-based networks.

Figure 9:
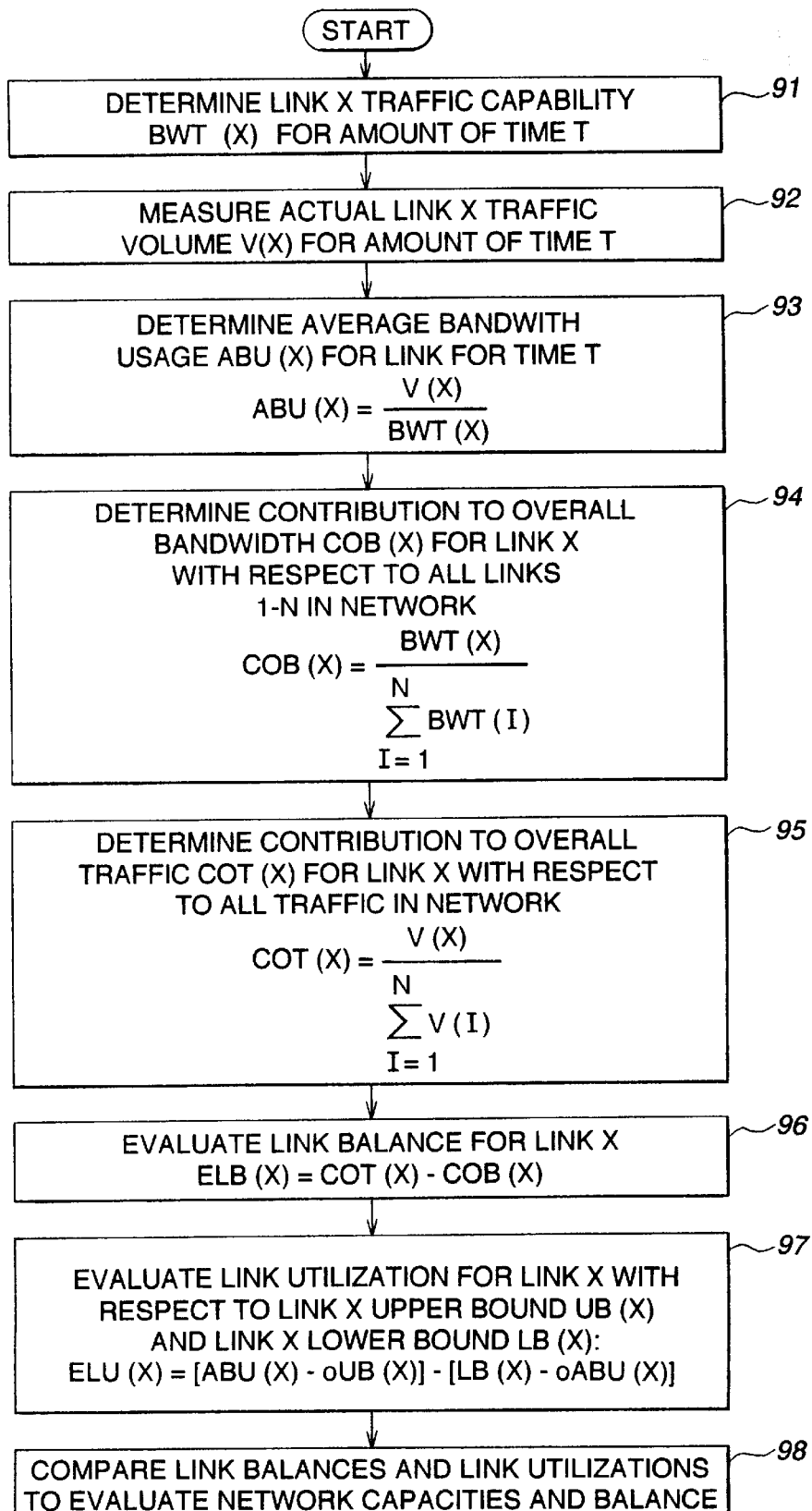
FIG. 9 is specific process flow diagram in accordance with an embodiment of the invention such as that shown in FIG. 7.
Figure 10:
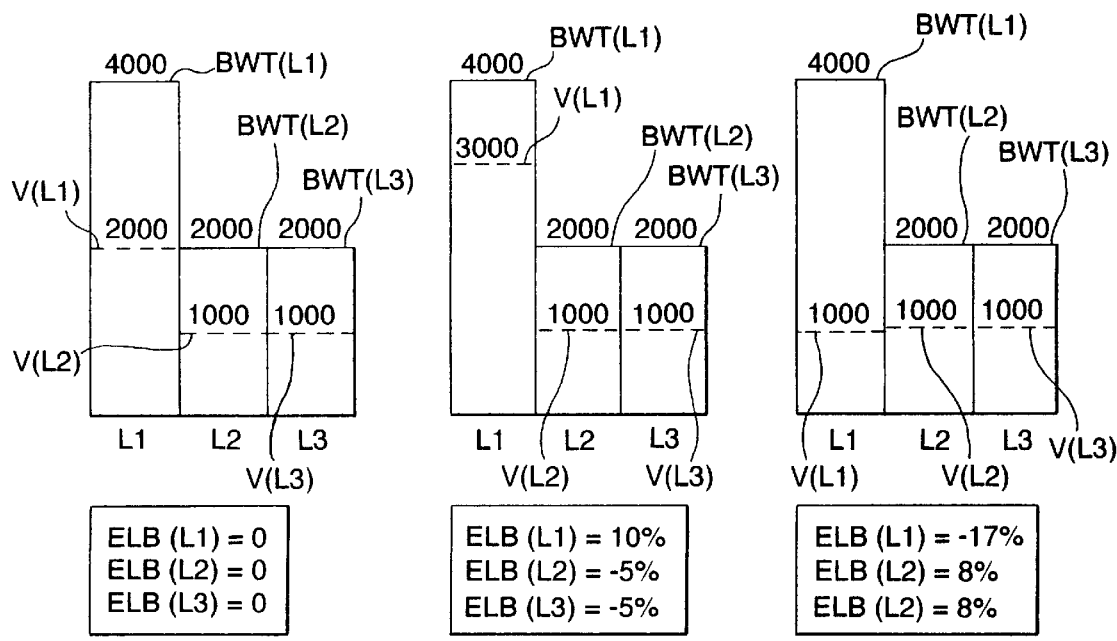
FIG. 10 shows exemplary structure of a network capacity database of FIG. 7.

FIG. 9 is a process flow diagram showing steps for performing capacity evaluation and planning (CEP) based upon link traffic volume and link traffic capability. Additionally, FIG. 10 shows exemplary structure 100 of the network capacity database 74 of FIG. 7, including link identifiers for each of the links of FIG. 8. This process and databased may be used to propose alternative configurations for the network of FIG. 8, as described hereinafter.

In step 91 (FIG. 9), the traffic capability BWT(X) of link X is determined for a particular amount of time T, where X is an identifier of one of the links under analysis. The traffic capability BWT may be determined for all links of a network, or for selected links for which analysis is desired. The traffic capability BWT may be calculated by multiplying the theoretical bandwidth (i.e., throughput) of a link by the time T; it may be further adjusted based upon overhead associated with the link X, if it is desired to remove this overhead from its impact on the bandwidth data.

An upper bound UB and lower bound LB are defied for each link by a system administrator; these are the defined limits within which the system should be operating for optimal performance. The traffic capability BWT, upper bound UB, and lower bound LB are referred to as predetermined data 102 in FIG. 10, and may be stored in the predetermined data 75 in FIG. 7.

In step 92, the actual traffic volume V(X) for link X is measured for the amount of time T, and stored as measured data 101. Note that the time T for steps 91 and 92 may be the same, or alternatively capabilities BWT and volumes V may be normalized or otherwise extrapolated to provide comparable data. From the volume V(X) and capability BWT(X), the average bandwidth usage ABU(X) is determined in step 93, for time T, as indicated in equation (1):

$$ABU(X)=V(X)/BWT(X). \qquad (1)$$

Thus, average bandwidth usage ABU(X) is a measure of the percentage of the total link X capability that is currently being used over time T. For example, a usage ABU(X) of 5% would indicate that link X may be underutilized because during the time T only 5% of its capability was used; this may represent excess capability and/or a suboptimal usage of resources.

In step 94, a contribution to overall bandwidth COB(X) is determined for link X with respect to all of the bandwidth in the network (i.e., all of the links in a designated network portion), as indicated in equation (2):

$$COB(X) = \frac{BWT(X)}{\sum BWT(I)}; \text{ where } I = 1, \ldots N \text{ for } N \text{ nodes.} \qquad (2)$$

Similarly, a contribution to overall traffic COT(X) is determined for link X with respect to all of the traffic in the network (step 95):

$$COT(X) = \frac{V(X)}{\sum V(I)}; \text{ where } I = 1, \ldots N \text{ for } N \text{ nodes.} \qquad (3)$$

The contribution to overall bandwidth COB defines a percentage of the bandwidth for a particular link X with respect to all bandwidth, while the contribution to overall traffic COT is a measure of the percentage of the actual traffic transmitted by the link X with respect to all traffic during the time T under consideration. Generally, if these percentages are similar for different links, then it means that the network is well-balanced with respect to both actual usage (traffic) and potential usage (bandwidth). Since a balanced network is generally desirable, these percentages may be used to determine the overall balance of a network.

These two contributions may also be compared with each other for a particular link X (step 96) by taking a difference, to define an evaluation of link balance ELB(X) for the particular link X according to equation (4):

$$ELB(X)=COT(X)-COB(X) \qquad (4)$$

When the contribution to overall bandwidth COB is equal to the contribution to overall traffic COT for a particular link, this is indicative that there is an ideal balance—the link is providing its "fair share" of the overall workload of the network. If the evaluation of link balance ELB is negative, then the link is doing less than its fair share, and if the evaluation of link balance ELB is positive, then the link is doing more than its fair share.

FIGS. 11A–C illustrate three different evaluations of link balance ELB for three links on a network having an overall bandwidth of 8000, i.e., capability to transfer 8000 traffic units over time T. In FIG. 11A, link L1, having a BWT(L1)=4000 provides 50% (4000/8000) of the overall bandwidth of a network, while links L2 and L3 each provide 25% of the overall bandwidth (where BWT(L2) and BWT(L3) are each 2000). Thus, the contribution to overall bandwidth COB for link L1 is 50%, while the contribution to overall bandwidth COB for links L2 and L3 are each 25%. Additionally, the contribution to overall traffic COT of link L1 is also 50% (a volume V(L1) of 2000 traffic units over time T out of the total 4000 traffic units), while the contribution to overall traffic COB for links L2 and L3 are each 25% (where volume V(L2) and V(L3) are each 1000 traffic units over time T). Accordingly, for the example shown in FIG. 11A, the evaluation of link balance ELB for each link is zero (i.e., there is no difference between the contribution to overall bandwidth COB and the contribution to overall traffic COT). This may be considered an optimal balance.

In the example illustrated in FIG. 11B, the traffic volume for link L1 V(L1) has increased to 3000 units, while all other parameters (of FIG. 11A) remain the same. Thus, the contribution to overall traffic of link L1 has increased to 60% (3000/5000), while the contribution to overall traffic COT of links L2 and L3 have each decreased to 20% (1000/5000). Since the bandwidth capabilities have not changed, the evaluation of link balance for link L1 ELB(L1) is 10% (60%-50%), while the evaluation of link balance for each of links L2 and L3 is now −5% (20%-25%). Thus, in the example of FIG. 11B, link L1 is carrying more than its fair share, while links L2 and L3 are each carrying slightly less than their fair shares.

In the example illustrated in FIG. 11C, the traffic volume for link L1 V(L1) has decreased to 1000 units while all other parameters remain the same. Thus, the contribution to overall traffic of link LI has decreased to 33% (1000/3000), while the contribution to overall traffic COT of links L2 and L3 have each increased to 33% (1000/3000). Since the bandwidth capabilities have not changed, the evaluation of link balance for link L1 ELB(L1) is now −17% (33%–50%), while the evaluation of link balance for each of links L2 and L3 is now 8% (33%-25%). Thus, in the example of FIG. 11B, link L1 is carrying less than its fair share while links L2 and L3 are each carrying more than their fair shares.

In step 97 of FIG. 9, a metric for evaluation of link utilization ELU is determined for link X, with respect to the upper bound UB and lower bound LB defined by the system administrator or derived from predetermined data, as shown in equation (5):

$$ELU(X)=[ABU(X)-0UB(X)]-[LB(X)-0ABU(X)] \qquad (5)$$

In equation (5), the term "–o" represents a "zeroed subtraction," in which the difference is determined between two values, and the result is the difference if the difference is positive but the result is always equal to zero if the difference is negative. For example, 7 −o 5=2, while 7 −o 20=0.

The evaluation of link utilization ELU is representative of how much, if at all, the average bandwidth usage ABU is either above or below the range defined by the upper bound UB and the lower bound LB for a link. These boundary values allow the system administrator to tailor the evaluation of link utilization to the particulars of the network under consideration. Ideally, the link utilizations will be within the bounds set by the system administrator, so the ELU will be equal to zero.

FIGS. 12A–C pictorially show examples of different evaluations of link utilization ELU for a particular link. In each of FIGS. 12A–C, the upper bound UB is 75% while the lower bound LB is 50%. In FIG. 12A, the average bandwidth usage ABU is 62%, resulting in an evaluation of link utilization ELU of 0, i.e. [62 −o 75]−[50 −o 62]=0−0=0. In FIG. 12B, the average bandwidth usage ABU is 25%, resulting in an evaluation of link utilization ELU of −25%,, i.e. [25 −o 75]−[50 −o 25]=0−25=−25. In FIG. 12C, the average bandwidth usage ABU is 87%, resulting in a evaluation of link utilization ELU of 12%, i.e. [87 −o 75]−[50 −o 87]=12−0=12.

In step 98 (FIG. 9), the link balance and link utilization evaluations may be compared with one another to determine metrics for network capacity and network balance. One example of such a metric is referred to as evaluation of link capacity ELC, determined from the evaluation of link balance ELB and the evaluation of link utilization ELU, as indicated in equation (6):

$$ELC(X)=[(ELB(X))^2+(ELU(X))^2]^{1/2} \quad (6)$$

In this example, the evaluation of link capacity ELC is the length of a vector that represents a sum of a vector representing an evaluation of link balance ELB, and a vector orthogonal to the ELB vector representing an evaluation of link utilization ELU. This is graphically shown in the graph of FIG. 13A, where evaluation of link balance ELB is plotted along the x-axis while evaluation of link utilization ELU is plotted along the y-axis. In this manner, a single quantity ELC can be used to represent network capacity, utilization and balance, wherein a lower value of ELC is generally desirable. For example, a situation in which both ELB and ELU are equal to zero, and thus ELC is equal to zero, is ideal.

In FIG. 13A, vector A represents a situation in which both the evaluation of link balance ELB and the evaluation of link utilization ELU are zero, which is representative of a network which is ideally balanced; the resulting ELC (A) (from equation 6) is also zero. Vector B represents an ELB of 0 and an ELU of 10 (per equation 6); this yields an ELC (B) of 10. Vector C represents an ELU of 20, and an ELC of 20; this yields an ELC (C) of 28. Vector D represents an ELB of 9 and an ELU of 0; this yields an ELC (D) of 9. Vector E represents an ELB of 10 and an ELB of −10; this yields an ELC (E) of 14.

FIG. 13A is a representative display which enables a system administrator to make decisions about network configuration. The specific quadrant within which the evaluation of link capacity ELC is plotted, provides useful information. In particular, a vector that is plotted in quadrant I indicates that the link is doing more than its fair share and is also exceeding its upper bound UB (of link utilization). Such a situation may be resolved (adjusted) by adding resources, e.g., another link in parallel with the link under consideration; this would serve to reduce both ELB and ELU, thus reducing ELC. In contrast, an ELC vector in quadrant III indicates that the link is doing less then its fair share and is also below its lower bound LB, which means that a link with less capacity may be substituted.

An ELC vector in quadrant II indicates that the link is performing less than its fair share, but is above its upper bound UB (in link utilization). An ELC vector in quadrant IV indicates that the link is performing more than its fair share, but is below its lower bound LB. It should be understood that in different applications it may be desirable to place upper and lower bounds on other parameters, such as ELB, or not to use such boundaries.

Another example of the applicability of a comparison of both link balance and link utilization is shown in FIGS. 13B–C. These figures show average link bandwidth ABU and contribution to overall traffic COT for three different links L1–L3, as compared to an upper bound UB and a lower bound LB for each of the three links L1–L3. In each of FIGS. 13B–C, it is assumed that the respective ABU and COT for a given link are equal. FIG. 13B illustrates a situation in which each link is in perfect balance, but each is also over-utilized. In contrast, FIG. 13C illustrates a situation in which each of links L1–L3 is within the range between the upper bound UB and lower bound LB (properly utilized), but the links are out of balance (as indicated by the COT and ABU for link L1 being significantly higher than the COT and ABU for links L2 and L3).

In addition to the metrics defined above for single links, it may be desirable to have a single metric that represents an evaluation of network capacity (ENC) for an entire network, so that a system administrator may evaluate the current network configuration with respect to an alternate network configuration. One example of ENC is to select the greatest ELC for all ELCs of a network. This evaluation is useful because the performance of a network is often limited by the link which is performing the worst—such a link representing a bottleneck in data communications. Thus, one version of an evaluation of network capacity ENC is shown in equation (7):

$$ENC=MAX\ (ELC(X)\ for\ all\ X) \quad (7)$$

For equation (7), a lower ENC represents a better-performing network because in general lower ELCs are preferred (as discussed above). In an alternative embodiment, the metric for evaluation of network capacity ENC is determined based upon a standard deviation over all ELCs of a link, as indicated in equation (8):

$$ENC=[((\Sigma ELC(I))^2\ for\ I=1-N)-(AVE\ (ELC(I)\ for\ I=1,\ldots N))]^{1/2} \quad (8)$$

where AVE is the average.

Equation (8) is a measure of how well the network is performing overall, and it is generally desirable that the ENC be zero or close to zero. As indicated above, it may be desirable to evaluate potential alternate configurations of a network to provide an ENC which is superior to the ENC of the current network configuration. Alternate configurations may be achieved in many ways, such as moving network servers among subnets, adding/deleting nodes, or adding/deleting switches.

As illustrated in FIG. 9, the inputs to the ENC evaluation are link traffic capability (BWT) and actual link traffic volume (V). Alternate configurations of a network may be simulated by simply modifying one or more of these variables, and then re-calculating the metric for ENC. This is a simple simulation which may be achieved with less processing and memory resources than required by the prior art simulators. For example, if it were desirable to evaluate an alternate to the network configuration of FIG. 8 in order to double the link capacity of cell link 3–4 (for example by adding a port each of swiches N2 and N3, and coupling these ports together), it is only necessary to change the value in the table of FIG. 10 that corresponds to the row of link 3–4 and the column labeled "BW" to be double the previous value. Then the evaluation factors 103 may be re-calculated based upon this new data, and these factors may be evaluated to determine the desirability of such a modification.

For some network changes this activity is straightforward. For example, adding or deleting bandwidth of a link is relatively simple, and may be achieved by upgrading the devices that connect via the link. Such a change may be simulated by increasing the corresponding values for BWT. However, other configuration changes may be more complex, such as those that affect the routing by which traffic is communicated. For example, adding a server to the network may affect bandwidth, but it may also affect how data is routed, which may significantly affect network balance.

Figure 14:
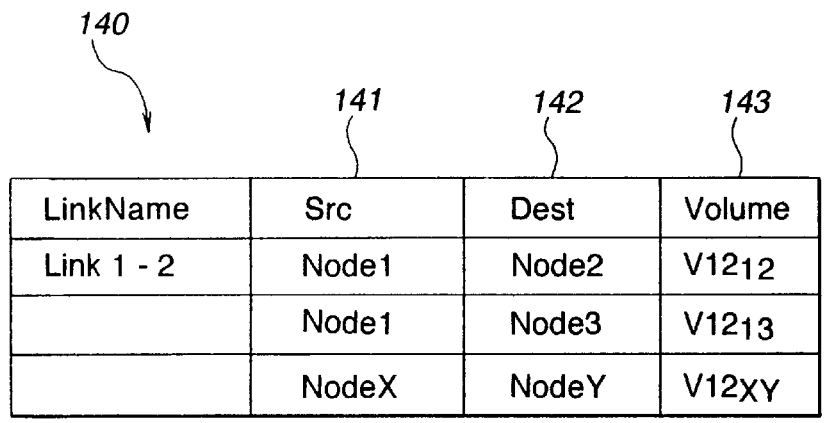
FIG. 14 shows a modification of the network capacity database of FIG. 10 to facilitate evaluation of link traffic volume based upon source and destination information.

To address this issue, the network capacity database 74 (FIG. 7) may include additional information, such as that shown in table 140 of FIG. 14. The entries in the table of FIG. 14 correspond to the volume of a single link 1–2, and are arranged by the traffic volumes that correspond to respective source and destination pairs. In particular, the volume column 101 of FIG. 10 may be expanded to include source column 141, destination column 142, and volume column 143. FIG. 14 shows that for the total volume of traffic transferred across link 1-2 during time T, a volume $V12_{12}$ was transferred from Node1 to Node2, a volume $V12_{13}$ was transferred from Node1 to Node3, and the volume $V12_{XY}$ was transferred from NodeX to NodeY.

This further classification of traffic volume as shown in FIG. 14 allows routing decisions for traffic between given destination/source pairs to be varied to evaluate alternate configurations. One approach is to modify the volume column using proportional distribution. For example, if it were desired to double all volume having Node1 as a source and Node2 as a destination, then all volumes $VXY_{12}$ would be doubled for all links (XY) through which such data passes. The added volume would thus be distributed, from a routing perspective, in the same proportions as in the current network configuration. This approach is especially useful for the addition/deletion of load generating devices, such as workstations or servers.

Although this approach may be useful on all network devices to minimize processing, it may be desirable to vary the approach if an ATM or other switch is being modified to create the alternate configuration, as opposed to a router. A switch may recalculate the most optimal (e.g., least cost) path each time that the combined traffic over a call-path is above a predetermined threshold. This behavior does not necessarily follow a rule of proportional distribution of traffic over different links, and therefore it may be desirable to invoke an adaptive learning mechanism which monitors the switch to determine the load distribution strategy adopted by the switch. More specifically, this may be achieved by studying the traffic inflow and outflow through a switch and the corresponding traffic load that is generated on the links attached to the various switch ports. Such a mechanism may be kept on-line in a training mode or learning mode of a live network, and could subsequently be used in an off-line capacity planning analysis for the same network. In this manner, the switch load distribution characteristics could be modeled with sufficient accuracy to project the load impact and therefore determine the source-destination volumes which would be affected by changing the switch.

Thus, step 63 in FIG. 6 may include generating alternate volume data proportionally or based upon the previous performance of a network device.

The invention may be implemented as a computer apparatus, in hardware, software, or a combination thereof, to perform the functions of any of the previous embodiments. For example, the invention may comprise a memory (such as a floppy disk, compact disk, or hard drive) that contains a computer program or data structure, for providing to a general purpose computer, instructions and data for carrying out the functions of the previous embodiments.

Figure 15:
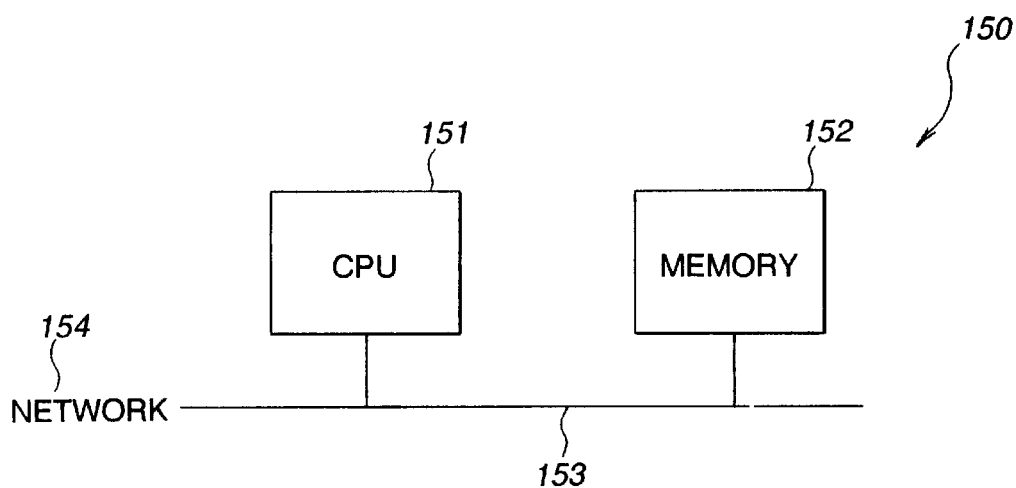
FIG. 15 shows a general purpose computer in accordance with at least one embodiment of the invention.

FIG. 15 shows a general purpose computer 150 which may include a Computer Processing Unit (CPU) 151, memory 152, a processing bus 153 by which the CPU can access the memory 152, and access to a network 154.

Having thus described several particular embodiments of the invention, various modifications and improvements will be apparent to those skilled in the art. Accordingly, the foregoing description is by way of example only, and not intended to be limiting.

What is claimed is:

1. A method for evaluating network traffic on a communications network, the network having a present configuration of nodes connected by a plurality of links, the method comprising the steps of:
   a) determining a traffic capability for an amount of time for each of the plurality of links of the network;
   b) measuring a traffic volume for the amount of time across each of the plurality of links; and
   c) evaluating a communications capability of the communications network based upon the traffic capability and the traffic volume.

2. The method of claim 1, wherein step c) includes determining a contribution to an overall bandwidth of the communications network by a first link of the plurality of links based upon the traffic capability of the first link with respect to a traffic capability of all of the plurality of links.

3. The method of claim 1, wherein step c) includes determining a contribution to an overall traffic of the communications network by a first link of the plurality of links based upon the traffic volume across the first link with respect to a traffic volume of all of the plurality of links.

4. The method of claim 3, wherein step c) further includes determining a contribution to an overall bandwidth of the communications network by the first link based upon the traffic capability of the first link with respect to a traffic capability of all of the plurality of links.

5. The method of claim 4, wherein step c) further includes a step of evaluating a link balance for the first link based upon a comparison between the contribution to overall bandwidth and the contribution to overall traffic.

6. The method of claim 1, wherein step c) includes a step of evaluating a link balance for a first link of the plurality of links based upon a comparison between a contribution to overall bandwidth of the communications network by the first link and a contribution to overall traffic of the communications network by the first link.

7. The method of claim 1, further comprising a step of defining an upper bound and a lower bound of link utilization for a first link of the plurality of links, and wherein step c) includes a step of evaluating a link utilization of the first link of the plurality of links with respect to the upper bound and the lower bound, based upon the traffic volume of the first link.

8. The method of claim 1, wherein step c) includes the steps of:
   evaluating a link balance for a first link of the plurality of links based upon a comparison between a contribution to overall bandwidth of the communications network by the first link and a contribution to overall traffic of the communications network by the first link;
   evaluating a link utilization of the first link of the plurality of links based upon the traffic volume of the first link; and
   evaluating the communications capability of the link based upon a comparison of the link balance with the link utilization.

9. The method of claim 1, wherein step c) includes the steps of
   evaluating the communications capability of each of the plurality of links; and
   evaluating the communications capability of the communications network based upon the communications capability of each of the plurality of links.

10. The method of claim 1, further comprising a step of evaluating a communications capability of an alternative configuration of the communications network based upon the traffic capability and a modified traffic volume.

11. The method of claim 10, further comprising a step of modifying the configuration of the communications network to the alternative configuration.

12. An apparatus for evaluating network traffic on a communications network having a plurality of links connecting devices, the apparatus comprising:

a database of link traffic information including monitored traffic volume and link capacity;

a capacity control and evaluation module connected to the database for receiving link traffic information from the database and determining a traffic capability for an amount of time for each of the plurality of links, and comparing the monitored traffic volume and traffic capability of the links to determine a network capacity parameter; and a user interface for displaying the network capacity parameter.

13. The apparatus according to claim 12, wherein the capacity control and evaluation module is configured to evaluate communications capabilities of a first network configuration and an alternative network configuration, and wherein the communication capabilities a re displayed by the user interface.

14. A method for evaluating network capacity of a communication link in a communications network, the method comprising steps of:

(a) measuring traffic volume of the link;

(b) comparing the measured traffic volume with a capability of the link; and (c) comparing a result of (b) with traffic volume and capability information of one or more other links in the communications network to determine a network traffic balance.

15. The method according to claim 14, further comprising a step of displaying the network traffic balance to a network user.

16. The method of claim 14, further comprising a step of evaluating traffic volume and capability of the link in an alternative configuration of the communications network.

* * * * *